United States Patent [19]

MacDonald

[11] Patent Number: 4,713,523

[45] Date of Patent: Dec. 15, 1987

[54] FIBER OPTIC CONNECTOR EPOXY CURING APPARATUS

[75] Inventor: Donald C. MacDonald, Holbrook, Mass.

[73] Assignee: GTE Government Systems Corporation, Waltham, Mass.

[21] Appl. No.: 902,550

[22] Filed: Sep. 2, 1986

[51] Int. Cl.⁴ .............................................. H05B 3/06
[52] U.S. Cl. ..................................... 219/385; 219/521; 219/386; 156/359; 156/423; 156/499; 156/433
[58] Field of Search ............... 219/385, 386, 521, 209, 219/210, 200, 201, 242, 243; 156/359, 423, 499, 433, 293, 166, 64

[56] References Cited

U.S. PATENT DOCUMENTS

| | | | |
|---|---|---|---|
| 1,694,725 | 12/1928 | Tabb | 219/242 |
| 2,932,718 | 4/1960 | Marsters | 219/242 |
| 3,023,293 | 2/1962 | Cornish | 219/200 |
| 3,607,134 | 9/1971 | McIntyre | 219/521 |
| 3,946,196 | 3/1976 | Waters | 219/242 |
| 4,287,408 | 9/1981 | Wilson | 219/521 |

FOREIGN PATENT DOCUMENTS

| | | | |
|---|---|---|---|
| 107250 | 4/1943 | Sweden | 219/385 |
| 777361 | 6/1957 | United Kingdom | 219/385 |

*Primary Examiner*—E. A. Goldberg
*Assistant Examiner*—Teresa J. Walberg
*Attorney, Agent, or Firm*—J. Stephen Yeo

[57] ABSTRACT

An apparatus for heat curing epoxy banded fiber optic connectors includes a housing containing a heater control circuit and an electronic thermometer. An L-shaped jig is attached to a surface of the housing with an interposing insulator. A heating element and temperature sensors are connect to the jig.

1 Claim, 2 Drawing Figures

FIBER OPTIC CONNECTOR EPOXY CURING APPARATUS

BACKGROUND OF THE INVENTION

This invention pertains to heat generating tools and, more particularly, is concerned with apparatus for heat curing fiber optic connectors.

One way to secure fiber optic connectors to a corresponding fiber is by an epoxy bond. Heating apparatus are used to heat cure the epoxy. Previous apparatus held connectors in large heated metal blocks weighing about fifty pounds. Such large blocks have high thermal inertia and it is difficult to regulate their temperatures. A consequence of excess heat is cracked fibers. Low heat results in poor bonding.

Furthermore, commercial curing equipment is generally adapted to accept only one of the many connector sizes available.

DETAILED DESCRIPTION OF THE INVENTION

Figure 1:
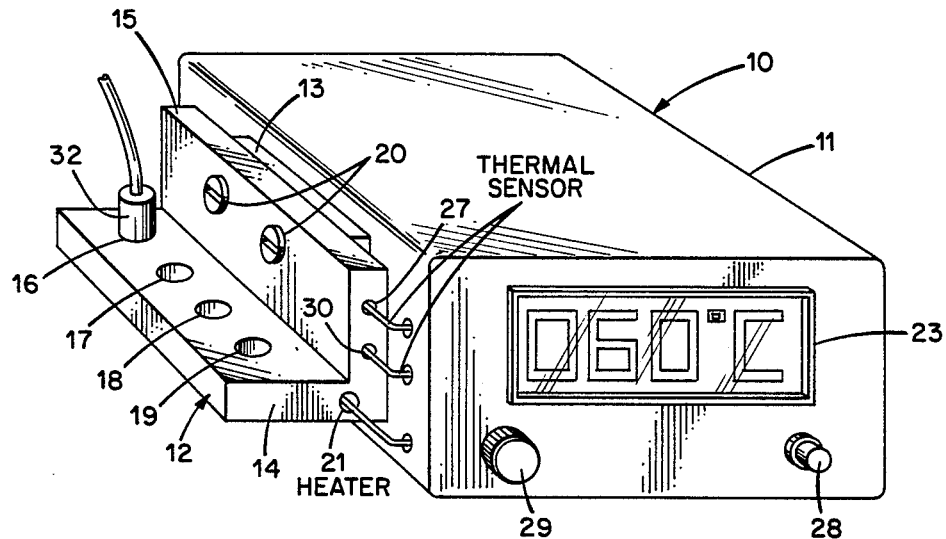
FIG. 1 is a pictorial view of the heat-curing apparatus of the invention.

Turning first to FIG. 1, there is seen, as an embodiment of the invention, apparatus 10 for heat curing epoxy bond of a plurality of fiber optic connectors.

Apparatus 10 includes a housing 11 which contains a known heating control circuit and an electronic thermometer circuit with an integral digital display.

As a feature of the invention, a jig 12 is mounted to an external surface of the housing. Jig 12 is spaced from housing 11 by a stand off member 13 which preferably is a block of thermal and electrical insulating material such as polytetrafluoroethylene.

Jig 12 is made of a good heat conducting metal such as copper or aluminum and, preferably, has an L-shape with two legs 14, 15. One leg 14, which is horizontally disposed, has a plurality of holes 16-17 in it. The holes are slightly larger than the connectors to be heat cured and are used to hold the connectors during curing. A representative connector 32 is shown in hole 16.

The other leg 15 which is vertically disposed is mechanically attached to the housing by mounting means 20 such as screws or plugs.

A heater 21, such as a 300 watt resistive element, is thermally coupled to the jig 12, preferable at the junction of the legs 14, 15.

Figure 2:
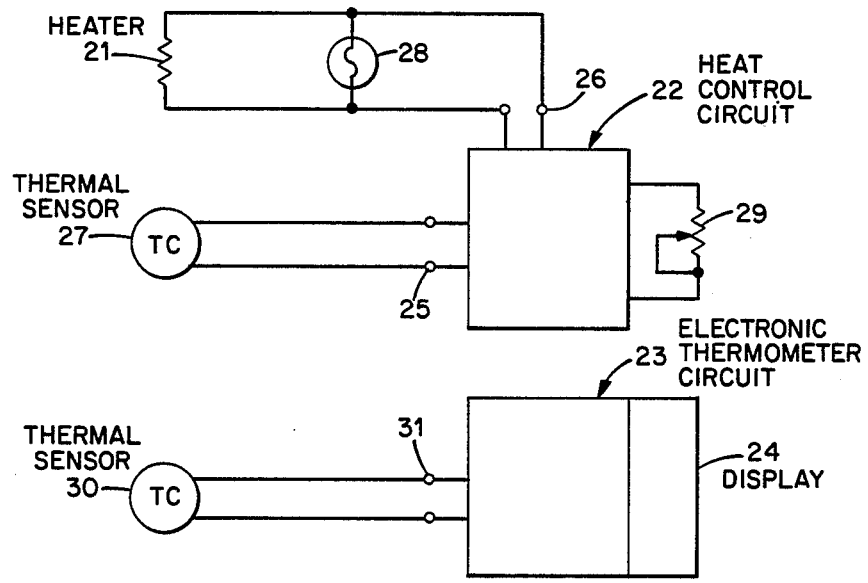
FIG. 2 is a block diagram of the electrical components of the apparatus.

Referring for now to FIG. 2, there is seen a block diagram of the electrical components of the apparatus which includes heat control circuit 22 and, electronic thermometer circuit 23 with integral display 24.

The heater control circuit 22 may be a known circuit using a comparator, a zero voltage crossing switch and a triac. The heater control circuit 22 has a thermal sensor input 24, 25 and a heater output 26. Heater 21 is electrically coupled to heater output 26. Heater control circuit 22 supplies electrical current to the heater 21 in response to a condition at the thermal sensor input. A first thermal sensor 27, which may be a thermocouple, is thermally coupled to the jig 12, preferably to the vertical leg, and electrically coupled to the thermal sensor input 24. A lamp 28 is arranged to indicate when voltage is applied to the heater 21. A potentiometer 29 sets the control circuit.

A second thermal sensor 30 is thermally coupled to the jig 12 preferably to the vertical leg 15. The second thermal sensor 30 is electrically coupled to a thermal sensor input 31 on thermometer circuit 23.

The electronic thermometer is used to indicate the actual jig temperature independently from heater control circuit 22.

Various jigs with corresponding heaters and thermal sensors may be provided to accommodate different size connectors. The feature of having the jig mounted to the housing allows the sensors and heater to be near the associated circuits and makes for a compact and sturdy unit suitable for field use.

The embodiment described represents the best mode of the invention. It will be appreciated, however, that modifications may be made by those skilled in the art. Therefore, the scope of the invention is determined by the following claims.

I claim:

1. Apparatus for heat curing a plurality of fiber optic connectors, comprised of:
    a housing;
    a heater control circuit within said housing having a thermal sensor input and a heater output;
    a metal jig having a plurality of holes for receiving fiber optic connectors;
    a first thermal sensor in thermal communication with said jig and electrical connector with said thermal sensing input of said heat control circuit;
    a thermally and electrically insulating stand off member interposed between said jig and said housing;
    a heater in thermal communication with said jig and in electrical communication with said heater output of said heater control circuit; and
    mounting means for attaching said jig to an external surface of said housing, wherein said jig has a horizontal leg having said holes, and a vertical leg coupled to said mounting means, and wherein said heater is located at the junction of said legs.

* * * * *